(12) United States Patent
Sasso

(10) Patent No.: US 6,553,936 B2
(45) Date of Patent: Apr. 29, 2003

(54) METHOD AND APPARATUS FOR A BIRD FEEDER

(75) Inventor: Michael Sasso, Oakland, CA (US)

(73) Assignee: Potrero Gardens, Inc., San Francisco, CA (US)

( * ) Notice: Subject to any disclaimer, the term of this patent is extended or adjusted under 35 U.S.C. 154(b) by 0 days.

(21) Appl. No.: 09/931,597

(22) Filed: Aug. 16, 2001

(65) Prior Publication Data

US 2003/0033988 A1 Feb. 20, 2003

(51) Int. Cl.[7] .............................................. A01K 39/01
(52) U.S. Cl. ..................................................... 119/72
(58) Field of Search ............................ 119/72, 77, 57.8, 119/52.2, 52.3; 215/52, 237, 244, 287, 290, 293

(56) References Cited

U.S. PATENT DOCUMENTS

| | | | |
|---|---|---|---|
| 823,125 A | * | 6/1906 | Kirkegaard |
| 1,754,542 A | * | 4/1930 | Brown |
| 3,132,760 A | * | 5/1964 | Dellinger ..................... 215/89 |
| 3,913,527 A | | 10/1975 | Kilham |
| D252,288 S | | 7/1979 | Kilham |
| 4,541,363 A | * | 9/1985 | Paoluccio ..................... 119/77 |
| 4,558,662 A | | 12/1985 | Peterson |
| D287,652 S | | 1/1987 | Mack |
| 4,691,665 A | | 9/1987 | Hefner |
| 4,901,673 A | | 2/1990 | Overstreet |
| 4,938,168 A | * | 7/1990 | Meidell ....................... 119/77 |
| D333,538 S | | 2/1993 | Kingsley |
| 5,247,904 A | | 9/1993 | Anderson |
| 5,303,674 A | * | 4/1994 | Hyde, Jr. ..................... 119/77 |
| 5,353,742 A | * | 10/1994 | Mauritz ....................... 119/77 |
| 5,507,249 A | | 4/1996 | Shaw |
| 5,628,277 A | * | 5/1997 | Machado ..................... 119/72 |
| D382,376 S | | 8/1997 | Bescherer |
| 5,682,835 A | * | 11/1997 | Walter et al. .............. 119/57.8 |
| D397,529 S | | 8/1998 | Fuller et al. |
| 5,924,382 A | | 7/1999 | Shumaker |

* cited by examiner

Primary Examiner—Charles T. Jordan
Assistant Examiner—Bret Hayes
(74) Attorney, Agent, or Firm—Stephen J. LeBlanc; Quine Intellectual Property Law Group, P.C.

(57) ABSTRACT

Methods and apparatus for a bird feeder that is formed of two vessels with detachable connectors between. The two vessels include a reservoir that stores feeding material and a feeding vessel with openings allowing birds to feed.

20 Claims, 8 Drawing Sheets

METHOD AND APPARATUS FOR A BIRD FEEDER

COPYRIGHT NOTICE

Pursuant to 37 C.F.R. 1.71(e), Applicants note that a portion of this disclosure contains material that is subject to and for which is claimed copyright protection (such as, but not limited to, drawings and/or design elements). The copyright owner has no objection to the facsimile reproduction by anyone of the patent document or patent disclosure, as it appears in the Patent and Trademark Office patent file or records. All other rights are reserved, and all other reproduction, distribution, creation of derivative works based on the contents, public display, and public performance of the application or any part thereof are prohibited by applicable copyright law.

FIELD OF THE INVENTION

This invention relates generally to hummingbird feeders and in particular to a feeder of unique construction of separable container portions and external support portions.

BACKGROUND OF THE INVENTION

Hummingbird feeders are distinct from the conventional feeder in that, rather than the usual dry food consumed by most birds, the hummingbird feeds on simulated nectar. The nectar is generally formed from water sweetened with sugar. The feeder is conventionally suspended from a branch, building or specially constructed stand by a wire or string.

In previous feeders, various devices have been employed for inhibiting ants or wasps from reaching the nectar. Other aspects have been employed for storing the nectar in a reservoir and conveying the nectar to a feeding location, such as simulated flowers. Perches are sometimes provided so that the hummingbird can land to feed.

Examples of prior art hummingbird feeders are shown in U.S. Patents including U.S. Pat. Nos. 4,901,673; 4,558,662; 3,913,527; 4,691,665; 5,247,904; 5,924,382; 5,507,249. Design patents issued for hummingbird feeders include; U.S. Pat. No. Des. 252,288 issued Jul. 3, 1979 to Kilhar, U.S. Pat. No. Des. 287,652 issued Jan. 6, 1987 to Mack and U.S. Pat. No. Des. 333,538 issued Feb. 23, 1993 to Kingsley.

A common bird feeder design involves a threaded glass or plastic vessel (such as a jar) with a screw-on bottom with feeding openings. The screw-on bottom is typically made of plastic or metal, partly to allow the easier construction of screw-on threads. In order to achieve the threading on the feeding vessel, the vessel is generally made of molded glass that is relatively thick to support the threads.

Another common bird feeder design involves a blown glass vessel with a bottom tube that is sometimes mounted in a stopper. The tube is typically a bent glass pipe, with a small enough opening that the surface tension of the liquid, combined with the vacuum produced when the vessel is inverted, hold the liquid in the feeder until a feeding organism punctures the surface of the liquid in the tube. This design is very prone to dripping when a bird is feeding, for example, and is also very accessible to wasps or other insects because the liquid is so accessible. Also, the blown glass generally must be of sufficient thickness to support insertion and removal of the cork.

While a number of different hummingbird feeder designs have been proposed, many of these designs result in inclusion of plastic bases, simulated flowers, screening or insect exclusion devices, etc., any of which can detract from the aesthetic appeal of the feeder. As many hummingbird feeders are used near a home or in a garden setting, there remains a sustained interest in hummingbird feeders with a simple functional design that allows for easy refilling and maintenance and will also have a pleasing form in a garden or home environment.

SUMMARY

The invention involves a hummingbird feeder that includes a storage vessel for nectar and a similar mated vessel for feeding. The two vessels are held together with fully or partially detachable connecting means, such as two or more springs or rubber connectors. The feeder is suspended by a wire that engages the storage vessel from a hook or loop provided thereon. The invention is overall characterized by simplicity in construction, function and appearance. In specific embodiments, the invention comprises only four separable pieces, the two vessels and two connectors.

In specific embodiments, the storage vessel has a shape roughly resembling an urn or flask or test-tube, with a hanging hook at the end of the closed portion of the vessel and a neck with an opening that fits into the feeding vessel. The storage vessel can be designed so that its shape will determine the extent to which its neck will extend into the feeding vessel or the storage vessel can include a lip or other construction that limits the extent to which its neck will extend into the feeding vessel. The storage vessel also includes hooks or loop or prongs for attaching to connectors for holding up the feeding vessel.

The feeding vessel is similar in overall shape and construction to the storage vessel. It comprises an opening for receiving a neck of the storage vessel also includes hooks or loops or prongs for attaching to connectors for being held up by the storage vessel. The feeding vessel also comprises structures allowing hummingbirds to feed.

Because of the unique design of the invention, according to specific embodiments, a bird feeder can be constructed without the need for any threading in either of the two vessels. Of itself, this may be thought to improve the overall appearance of the feeder. This also allows the feeder to be manufactured easily as two pieces of blown glass, something not possible if threading were needed. Finally, the design allows use of thinner glass that other glass designs, allowing creation of designs that are both light in weight and more elegant in appearance.

Thus, the invention provides a new and improved hummingbird feeder and methods for the same that has a simplicity in construction and assemble and that also is simple to fill and clean.

Other Features & Benefits

The invention and various specific aspects and embodiments will be better understood with reference to the following drawings and detailed descriptions. In different figures, similarly numbered items are intended to represent similar functions within the scope of the teachings provided herein. In some of the drawings and detailed descriptions below, the present invention is described in terms of the important independent embodiment of specific hummingbird feeders of specific design and construction, in some cases including specific materials. This should not be taken to limit the invention, which, using the teachings provided herein, can encompass a variety of different materials of construction and a variety of different design elements. It is therefore intended that the invention not be limited except as provided in the attached claims.

DESCRIPTION OF SPECIFIC EMBODIMENTS

Figure 1A:
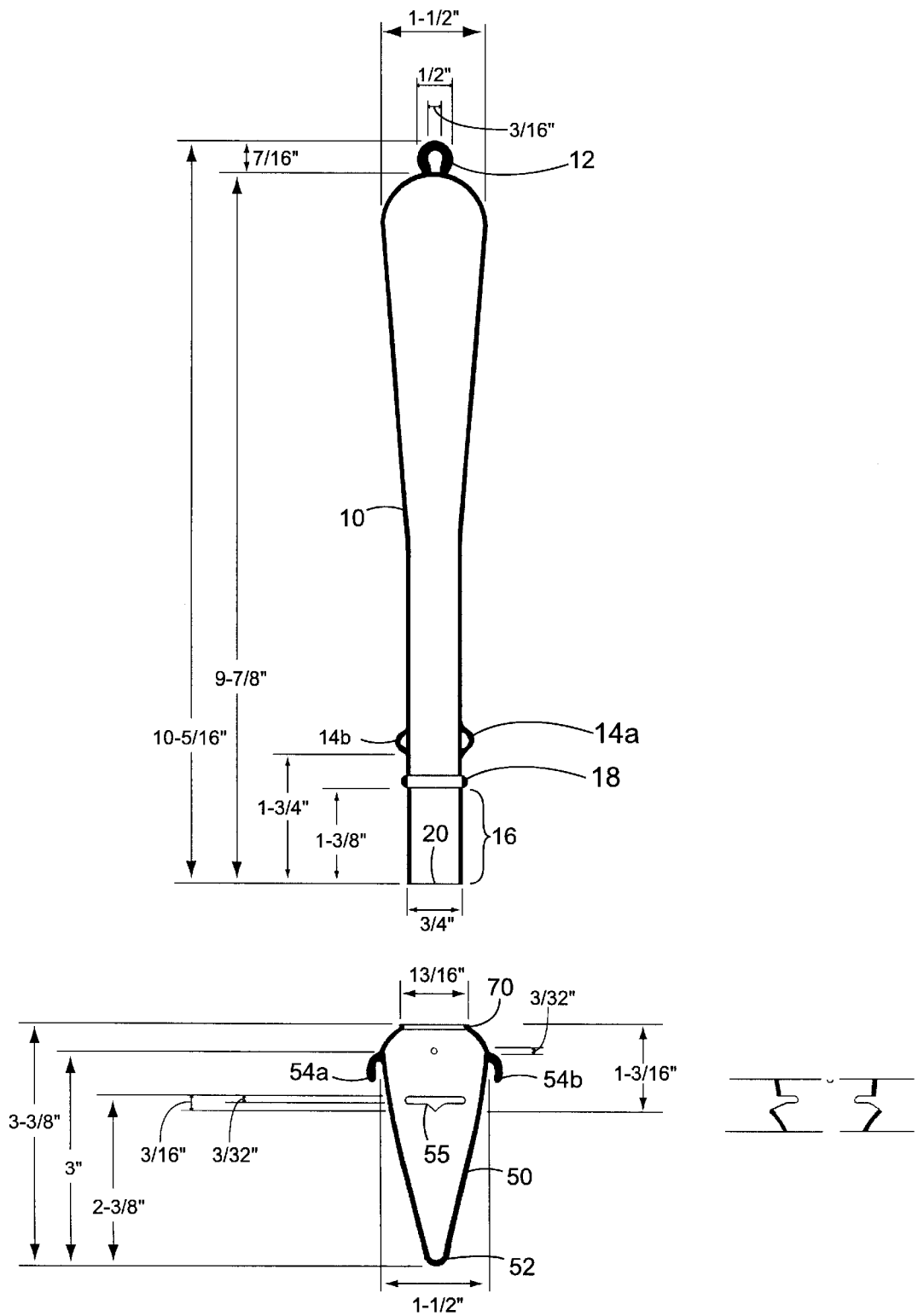
FIG. 1A is a cross sectional view of a feeder according to specific embodiments of the invention.
Figure 1B:
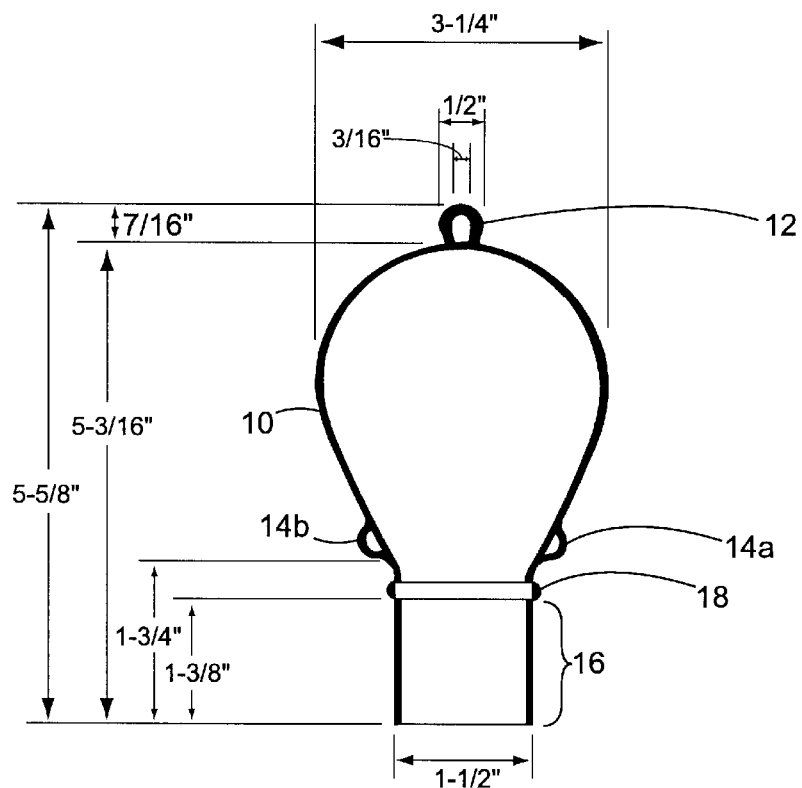
FIG. 1B is a cross sectional view of a feeder according to alternative specific embodiments of the invention.
Figure 1B:
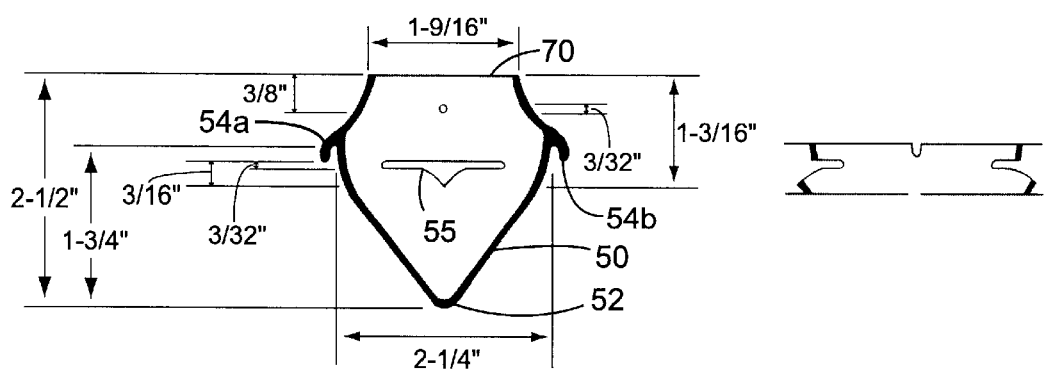

FIG. 1A and 1B are cross sectional views of feeder vessels according to specific embodiments of the invention. These feeders vary in the overall shapes of the vessels but otherwise operate similarly. The feeders comprise a storage vessel 10 and a feeding vessel 50. In a particular embodiment, the space defined by the feeding vessels is symmetrical along the longest central axis of the vessels. The dimensions shown in the figures are examples only and feeders of a wide range of sizes can be constructed according to specific embodiments of the present invention.

Storage vessel 10 includes the features of a hanger 12 from which the assembled feeder is removeably hung, such as by a string, strap, wire or hook. When in feeding position, hanger 12 will generally be the top most portion of the feeder and so this portion is sometimes referred to as the top of the feeder. Hanger 12 can comprise a complete loop, a partial loop, or any other convenient shape for hanging the vessel. If desired, hanger 12 may be omitted and the feeding vessel may be mounted to a device such as a pole hanger. Hanger 12 may be rotated at the top of vessel 10 in any direction desired. However, in one embodiment, hanger 12 will be aligned as shown to create a more symmetrical appearance.

Vessel 10 also includes connection points 14a and 14b. These connection points are illustrated as complete loops extending from the exterior of vessel 10 but the could alternatively be half-loops, simple protrusions, or indentations, depending on the nature of the detachable connector used to hold the vessels together in the feeding position. For references purposes, when two connection points are present, the connection points may be said to reside on the sides of vessel 10 with the front and back designated as the views orthogonal to the sides. It will be understood that these designations are arbitrary, however. It will also be understood that while two connection points are believed sufficient to hold the feeder together, any number of connection points may be provided if so desired or deemed necessary for larger designs or designs using varied materials. It is also possible to construct connection points 14 as a lip surrounding the entire storage vessel and allowing connection to any place on the lip.

Neck portion 16 of the vessel 10 is illustrated as a straight-sided cylinder. Again, different forms are possible according to specific embodiments of the present invention, so long as the neck portion can mate with the feeding vessel 50.

An optional collar 18 is also illustrated. This collar serves to provide a well-defined mating lip for the feeding vessel when the feeder is assembled. Alternatively, the collar may be omitted and the feeding vessel may rest against the connection points 14 or may be constructed to rest at a portion of the storage vessel where the vessel diameter expands greatly, as can be understood by examining the shape shown in FIG. 1B. As a further alternative, the feeding vessel may be intended to hang somewhat loosely when connected to the storage vessel and so no resting place is needed.

Neck portion 16 terminates at the lower end in a lip 20 defining an opening. When disassembled, the opening allows introduction of a feeding material such as a feeding solution or alternatively seed. When disassembled, the opening allows for easy cleaning of the storage vessel. When assembled, the opening allows for transfer of the feeding material into the feeding vessel as the feeding vessel is emptied by birds.

Feeding vessel 50 includes the features of a closed end 52. When in feeding position, closed end 52 will generally be the bottom-most portion of the feeder and so this portion is sometimes referred to as the bottom of the feeder. Portion 52 is generally desired to be constructed close to the feeding openings and in a shape allowing birds access to most or all of the feeding material that reaches the bottom of the feeding vessel. This helps prevent build up of inaccessible feeding material that can become spoiled.

Vessel 50 also includes connection points 54a and 54b. These connection points are illustrated as partial loops extending down the exterior of vessel 50 but they could alternatively be full loops, simple protrusions, or indentations, depending on the nature of the detachable connector used to hold the vessels together. According to specific embodiments of the present invention, these connection points are placed to be in alignment with connection points 14a and 14b when the feeder is assembled. It will be understood that while two connection points are believed sufficient to hold the feeder together, any number of connection points may be provided if so desired or deemed necessary. If, for example, connection point 14 is constructed as a lip, any desired number of connection points 54 could be placed on vessel 50.

One or more feeding openings 55 are also included in vessel 50. As shown, these openings generally are of an extended rectangle with rounded corners, with a lip pulled down and extended outward. The openings are arranged to be horizontal, i.e. orthogonal to the vertical axis of the feeder in feeding position. Other shapes for the feeding opening are possible, but this shape has been determined to allow birds easy access to the feeding material and to reduce unwanted drips.

Feeding vessel 50 terminates at its upper end in a lip or edge 70 defining an opening. When disassembled, this opening allows for easy cleaning. When assembled, the opening allows for receiving of neck 16 and for transfer of the feeding material from the storage vessel. Edge 70 can be of nominal thickness or can be made of a thickness complementary to collar 18, as illustrated in the figures below.

Manufacture

In particular embodiments, these vessels can be understood to each be constructed as a single piece of a single material. For example, vessel 10 can be constructed from a single piece of blown or molded glass, including all the elements illustrated in the figure. Such a one-piece construction may reduce manufacturing and handling costs, allows for easy handling and cleaning by the end user, and may be aesthetically pleasing. Alternatively, vessel 10 may be constructed from a single piece of molded plastic, a single piece of molded or shaped metal, or any other suitable material, such as ceramic. In any case, according to specific embodiments of the present invention, one advantage of the design is that vessel 10 can be, though is not necessarily, constructed as a single piece.

According to specific embodiments of the invention, vessel 10 is preferable preferably constructed of a translucent material, such as translucent glass or plastic. The translucent material allows easy visual determination of whether the feeder is full. The translucent material may be such materials as colorless or colored translucent glass or plastic.

Feeding vessel 50 is likewise preferably constructed as a single piece and can be constructed using any of the materials described above for vessel 10. If it is so desired, vessels 50 and 10 can each be constructed of exactly the same materials, such as both out of colorless glass. Alternatively, if so desired, vessels 50 and 10 can be constructed from different materials. For example, it is generally believed that hummingbirds are most attracted to colored feeders. Thus, vessel 50 can be constructed from a colored glass or plastic, while vessel 10 is constructed of a colorless glass or plastic. Alternatively, for aesthetic reasons, it may be desired to construct feeder 50 of a visual pleasing and non-reactive metal, such as stainless steel, while constructing vessel 10 out of colored or colorless translucent glass. Any number of variations of material constructions will be understood as encompassed according to specific embodiments of the present invention.

Connectors

Figure 2A:
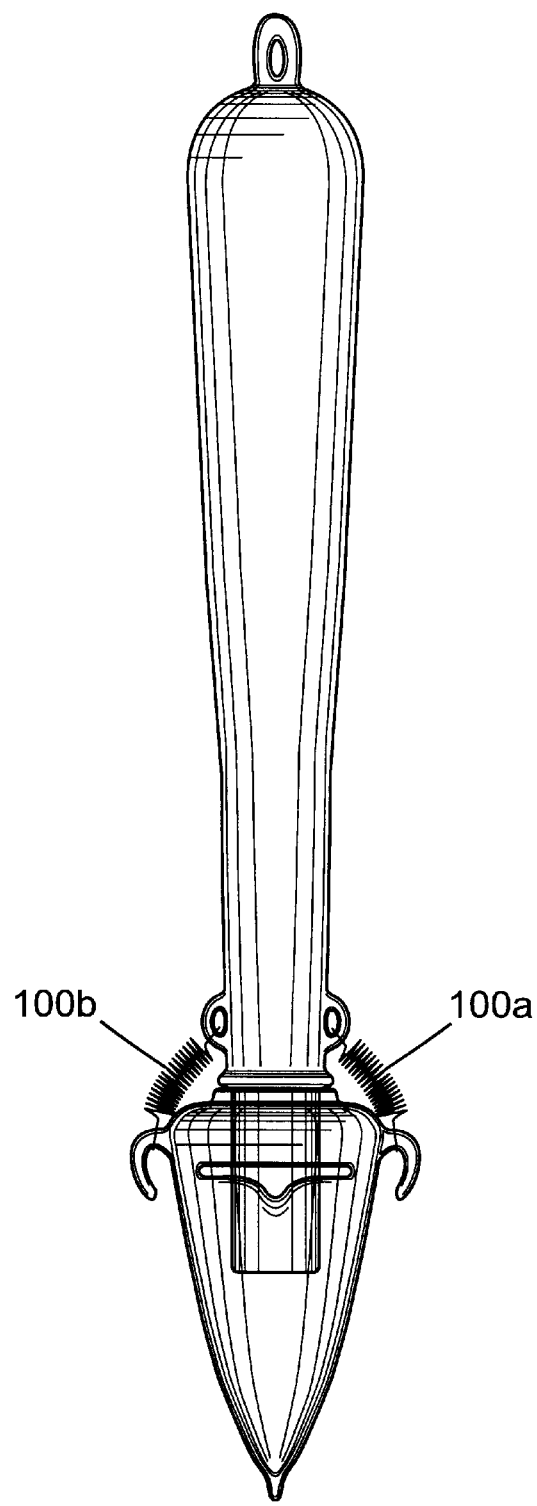
FIG. 2A is a front elevation view of a feeder according to specific embodiments of the invention.
Figure 2B:
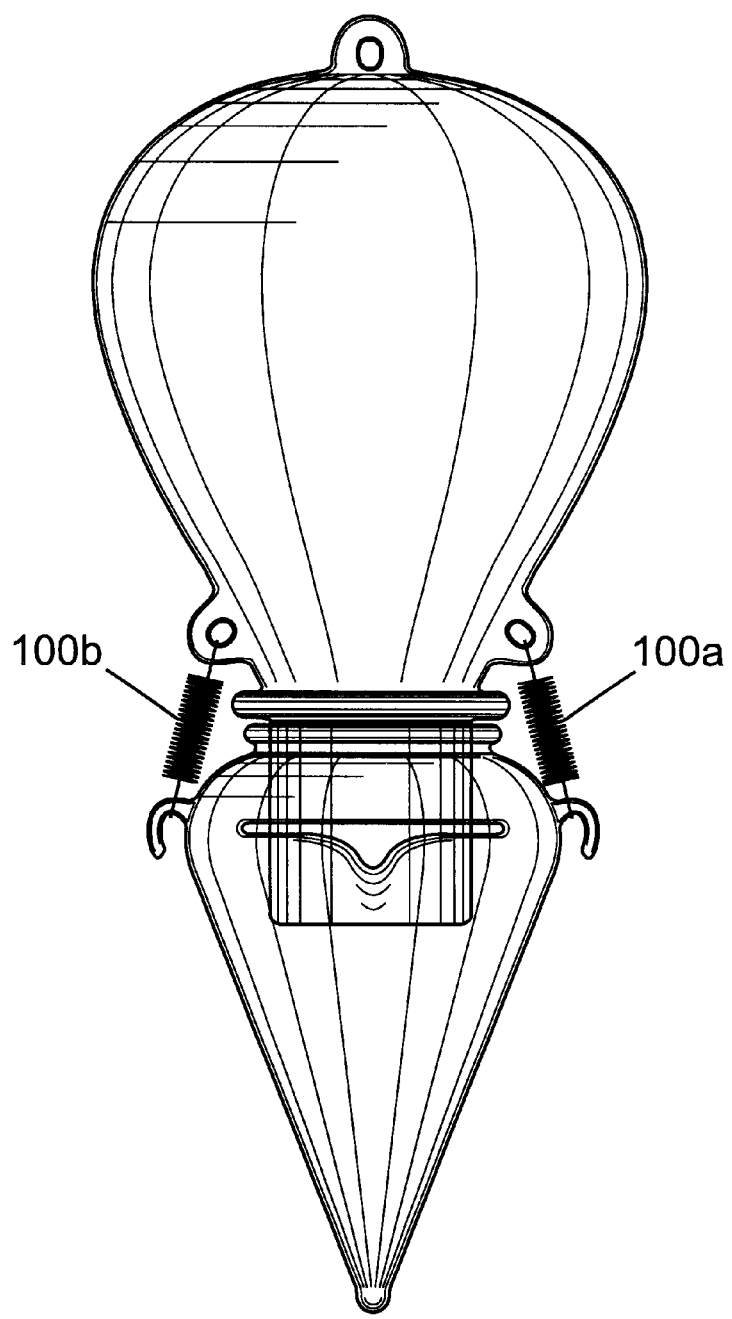
FIG. 2B is a front elevation view of a feeder according to alternative specific embodiments of the invention.
Figure 3A:
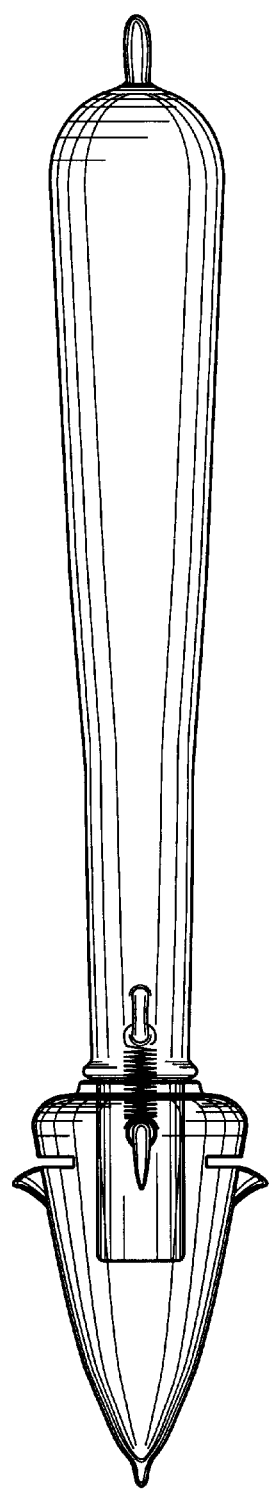
FIG. 3A is a side elevation view of a feeder according to specific embodiments of the invention.
Figure 3B:
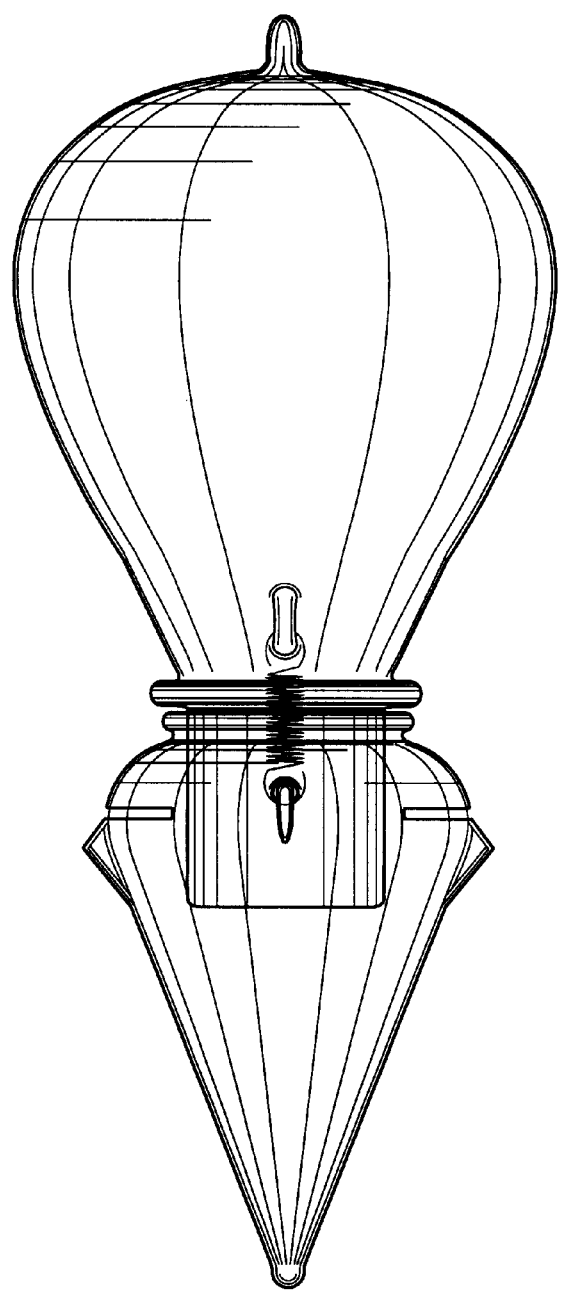
FIG. 3B is a side elevation view of a feeder according to alternative specific embodiments of the invention.

Referring now to FIG. 2A and 2B, feeders according to specific embodiments of the present invention are shown generally from an external view. In these and subsequent figures, feeders are illustrated as though constructed from a clear material, such as glass or plastic, that allows a view through the feeder to observe all parts thereof. Illustrated in FIGS. 2A, 2B, 3A, or 3B is a specific embodiment of connectors 100, which in this embodiment are illustrated as springs. As will be understood in the art, such springs can commonly be made of metal, plastic, or any other extensible and retractable material. Connectors 100 could also comprise rubber bands or rubber connectors that also have a similar spring-like extensible and retractable property.

In other embodiments, it is not necessary that the connectors be spring like but merely that they be removable to allow filling of vessel 10 and that they hold the feeder base in place when inverter so that the lip 20 of neck 16 remains below the desired feeder material level in vessel 50 when the feeder is in feeding position.

In the feeder illustrated in FIGS. 2A, 2B, 3A, or 3B, it is a further characteristic that when the feeder vessel is detached from the connectors holding it to the storage vessel, connectors 100 remain attached to the storage vessel. This is desirable in that it helps prevent the connectors from being misplaced, though it is not a necessary characteristic of the invention.

Figure 4B:
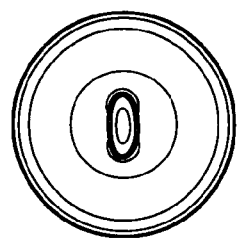
FIG. 4B is a top elevation view of a feeder according to alternative specific embodiments of the invention.
Figure 4A:
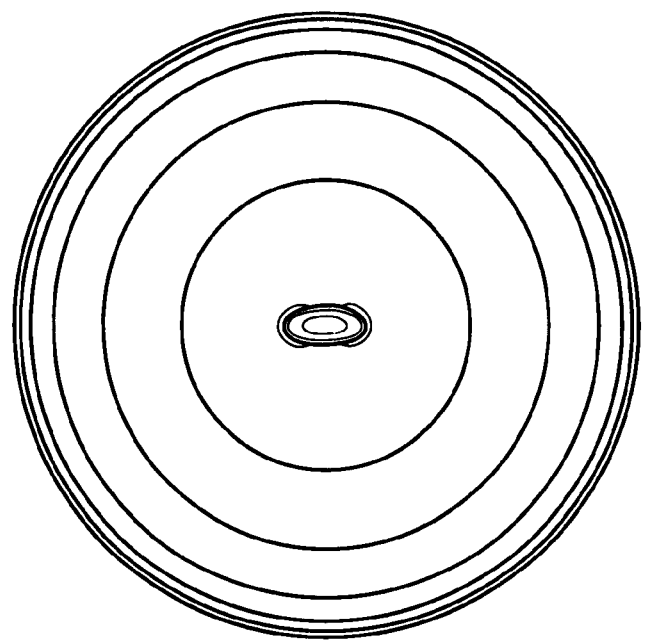
FIG. 4A is a top elevation view of a feeder according to specific embodiments of the invention.
Figure 5A:
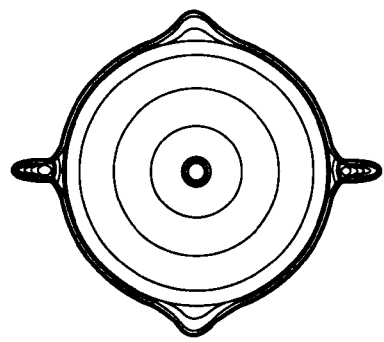
FIG. 5A is a bottom elevation view of a feeder according to specific embodiments of the invention.
Figure 5B:
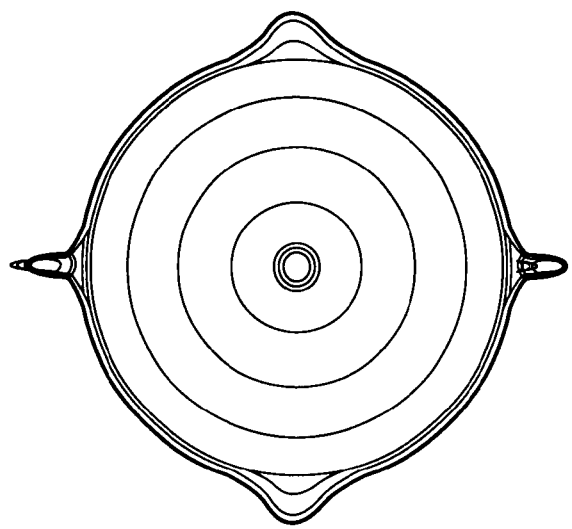
FIG. 5B is a bottom elevation view of a feeder according to alternative specific embodiments of the invention.

FIGS. 4A and 4B are top elevation views of feeders according to specific embodiments of the invention. FIGS. 5A and 5B are bottom elevation views of feeders according to specific embodiments of the invention.

It is understood that the examples and embodiments described herein are for illustrative purposes and that various modifications or changes in light thereof will be suggested by the teachings herein to persons skilled in the art and are to be included within the spirit and purview of this application and scope of the claims.

All publications, patents, and patent applications cited herein or filed with this application, including any references filed as part of an Information Disclosure Statement, are incorporated by reference in their entirety.

What is claimed:

1. A bird feeder, comprising,
    a feeder base, having a top opening for receiving a food reservoir, having at least one feeding port for allowing a bird access to food, and having at least two exterior connection locations;
    said food reservoir, having a bottom neck with an opening able to be inserted into said feeder base, and having at least two exterior connection locations; and
    at least two connectors, said connectors each connecting one exterior connection locations of said feeder base to one exterior connection location of said food reservoir such that said feeder base hangs from said connectors when said feeder is in feeding position.

2. The feeder according to claim 1 wherein said connectors are removably connected between said feeder base and said food reservoir allowing said food reservoir opening to be exposed so that food can be placed therein.

3. The feeder according to claim 1 wherein said feeder base is manufactured as a single unit from a single material.

4. The feeder according to claim 1 wherein said food reservoir is manufactured as a single unit from a single material.

5. The feeder according to claim 1 wherein said feeder base comprises a single piece of glass.

6. The feeder according to claim 1 wherein said food reservoir comprises a single piece of glass.

7. The feeder according to claim 1 wherein said feeder base comprises a single piece of plastic.

8. The feeder according to claim 1 wherein said food reservoir comprises a single piece of plastic.

9. The feeder according to claim 1 wherein said food reservoir further comprises a top external protuberance able to receive a support for hanging said bird feeder.

10. The feeder according to claim 1 wherein said connectors each comprise an extensible member, with openings on each end for connecting to said exterior connection locations.

11. The feeder according to claim 1 wherein said connectors each comprise an extensible spring, with openings on each end for connecting to said exterior connection locations.

12. The feeder according to claim 1 wherein said bird feeder comprises four separable components, said separable components comprising: a unitary feeder base, a unitary food reservoir, and two unitary connectors.

13. The feeder according to claim 1 wherein no threads are necessary in said feeder base or said food reservoir and said feeder base and said food reservoir are functionally rigid.

14. The feeder according to claim 12 wherein said unitary feeder base and said unitary food reservoir each have two external connection locations, said two external connection locations arranged opposite each other on side external surfaces of said unitary feeder base and said unitary food reservoir.

15. The feeder according to claim 1 wherein said at least one feeding port comprises a roughly rectangular port with rounded corners for allowing a bird access to food and further wherein said port is placed so that its longer axis is nearly parallel with said opening in said feeder base and further wherein said rectangular port comprises a lip in its lower edge.

16. A method enabling feeding of birds comprising:

providing a feeder base of unitary construction having a top opening for receiving a food reservoir, having at least one feeding port for allowing bird access to food, and having at least two exterior connection locations;

providing a food reservoir of unitary construction, having a bottom neck with an opening able to be inserted into said feeder base, and having at least two exterior connection locations; and providing at least two connectors, said connectors each connecting one exterior connection location of said feeder base to one exterior connection location of said food reservoir, said connectors allowing detachment of said feeder base from said food reservoir such that a person wishing to feed birds can detach said food reservoir from said feeder base, invert said food reservoir to fill said food reservoir with feeding material, place said feeder base over said food reservoir and connect said connectors between feeder base connection locations s and food reservoir connection locations, and invert an assembly of said feeder base and said reservoir such that a neck of said reservoir remains within said feeding base and below a desired level of feeding material, which is below said at least one feeding port;

wherein said feeder base hangs from said connectors when said feeder is in feeding position.

17. A bird feeder, comprising:

a means for holding food materials, said means having a threadless and functionally rigid bottom insertable means, said bottom insertable means having an opening means and having first external connection location means;

a means for providing access to food materials to birds, said means having a threadless and functionally rigid top opening means for receiving said bottom insertable means, having at least one feeding means for allowing bird access to food and having second exterior connection location means; and exterior connection means connecting between said first exterior connection location means and said second exterior connection location means such that said feeder base hangs from said connectors when said feeder is in feeding position.

18. The feeder according to claim 17 further comprising:

attachment means located at the closed end of said means for holding food materials, said attachment means useable for hanging an assembled bird feeder.

19. The feeder according to claim 17 further wherein:

said means for holding food materials and said means for providing access to food materials are each made of a single material in a single piece.

20. The feeder according to claim 17 further wherein:

said means for holding food materials and said means for providing access to food materials are each manufactured as a single glass vessel.

* * * * *